United States Patent [19]

Prockup

[11] Patent Number: 6,157,505
[45] Date of Patent: Dec. 5, 2000

[54] SYSTEM AND A METHOD OF OPERATION THEREOF FOR ANALYZING THE PERFORMANCE OF A TAPE RECORDER

[75] Inventor: Kenneth M. Prockup, Emmaus, Pa.

[73] Assignee: The United States of America as represented by the Secretary of the Navy, Washington, D.C.

[21] Appl. No.: 09/100,701

[22] Filed: Jun. 19, 1998

[51] Int. Cl.[7] .............................. G11B 27/36; G11B 5/09
[52] U.S. Cl. ................................. 360/31; 360/53
[58] Field of Search ................... 360/31, 53, 65, 360/66

[56] References Cited

U.S. PATENT DOCUMENTS 4,746,991  5/1988  Efron et al. ............................... 360/31
4,891,716  1/1990  Andersen ................................. 360/31

*Primary Examiner*—W. Chris Kim
*Attorney, Agent, or Firm*—Ron Billi

[57] ABSTRACT

A system, and a method of operation thereof, for analyzing the performance of a tape recorder having a playback head is disclosed. The system allows for the recorded data of the tape recorder to be routed to a analog-to-digital converter whose output is delivered to a digital signal processor preferably having a routine to convert the digital data to an FFT data stream which, in turn, is routed to a microprocessor. The computer analyzes the FFT data and provides digital signals to external display devices that indicate the proper recording of the tape recorder, the need for the recorder's heads to be cleaned, the occurrence of excessive dropout data recording rate, or the need to manually or automatically adjust the bias and equalization levels of the tape recorder.

5 Claims, 6 Drawing Sheets

SYSTEM AND A METHOD OF OPERATION THEREOF FOR ANALYZING THE PERFORMANCE OF A TAPE RECORDER

BACKGROUND OF THE INVENTION

1. Field of the Invention

The present invention relates to a verification system, and method of operation thereof, for verifying the operational performance of a tape recorder and, more particularly, to a system that employs digital techniques to automatically verify the operational performance of the tape recorder, with special attention being given to detecting tape recording dropout occurrences and unclean read/write (playback) heads.

2. Description of the Prior Art

A tape recorder comprises read/write (play or playback) heads for reading/writing, by means of an analog process, data onto a tape. The tape recorder is typically responsive to bias and equalization levels. The data recorded onto a tape recorder may be of a critical nature, especially if the tape recorder is used on board an aircraft. Accordingly, the operational readiness of such a tape recorder should be verified before the mission of the aircraft is undertaken.

A current method for verifying the readiness and also the operational performance of the tape recorder to be used on board an aircraft involves the utilization of a signal generator, a portable oscilloscope, and/or an audio spectrum analyzer interconnected to test points of the tape recorder. The handling of the involved equipment becomes a cumbersome and time consuming task, especially on board the aircraft having cramped quarters. Further, the manipulation for testing purposes of the equipment carried on board the aircraft needs to be accomplished by a skilled technician. It is desired that means be provided that eliminates this cumbersome and time consuming task, while at the same time automatically verifying the operational performance of the tape recorder so as to eliminate the need of a skilled technician to perform the testing.

OBJECTS OF THE INVENTION

It is a primary object of the present invention to provide a system, and a method of operation thereof, that automatically verifies the operational readiness and performance of a tape recorder without the need of cumbersome test equipment and without the need of a skilled technician.

It is a further object of the present invention to provide a system, and a method of operation thereof, that utilizes digital techniques to verify the operational readiness and performance of the tape recorder with special attention being given to detecting tape recording dropout conditions and unclean read/write (playback) heads.

It is a further object of the present invention to provide a system, and a method of operation thereof, that adjusts the bias and equalization levels of a tape recorder to assure proper performance thereof.

It is a further object of the present invention to provide for digital signal processing techniques to analyze the signals of a tape recorder so that go/no-go indications may be provided to a non-technician operator to notify the operator of tape dropout or dirty tape head conditions.

It is another object of the present invention to provide for signal processing techniques that employs fast fourier transforms so that the complex signals may be broken down into elementary components thereof to ease the analysis task needed to determine the proper performance for the tape recorder.

SUMMARY OF THE INVENTION

The present invention is directed to a system, and a method of operation thereof, that employs digital techniques which automatically verify the operational readiness of a tape recorder without the need of any excessive operator intervention.

The system comprises a signal generator, an analog-to-digital converter, a digital signal processor, and means for receiving and analyzing digital data. The signal generator generates a predetermined waveform for a predetermined duration which waveform is routed to a record input of the tape recorder. The analog-to-digital converter receives the output of a playback head of the tape recorder and provides a corresponding digital signal thereof. The digital signal processor receives the digital signal and converts it into digital data representative of elementary components thereof. The means for receiving and analyzing the digital data determines the operational performance of the tape recorder and services displays that inform the operator of the status of the operational performance of the tape recorder.

BRIEF DESCRIPTION OF THE DRAWINGS

These and other objects, features and advantages of the invention, as well as the invention itself, become better understood by reference to the following detailed description when considered in conjunction with the accompanying drawings wherein like reference numbers designate identical or corresponding parts throughout and wherein.

DETAILED DESCRIPTION OF THE PREFERRED EMBODIMENTS

Figure 1:
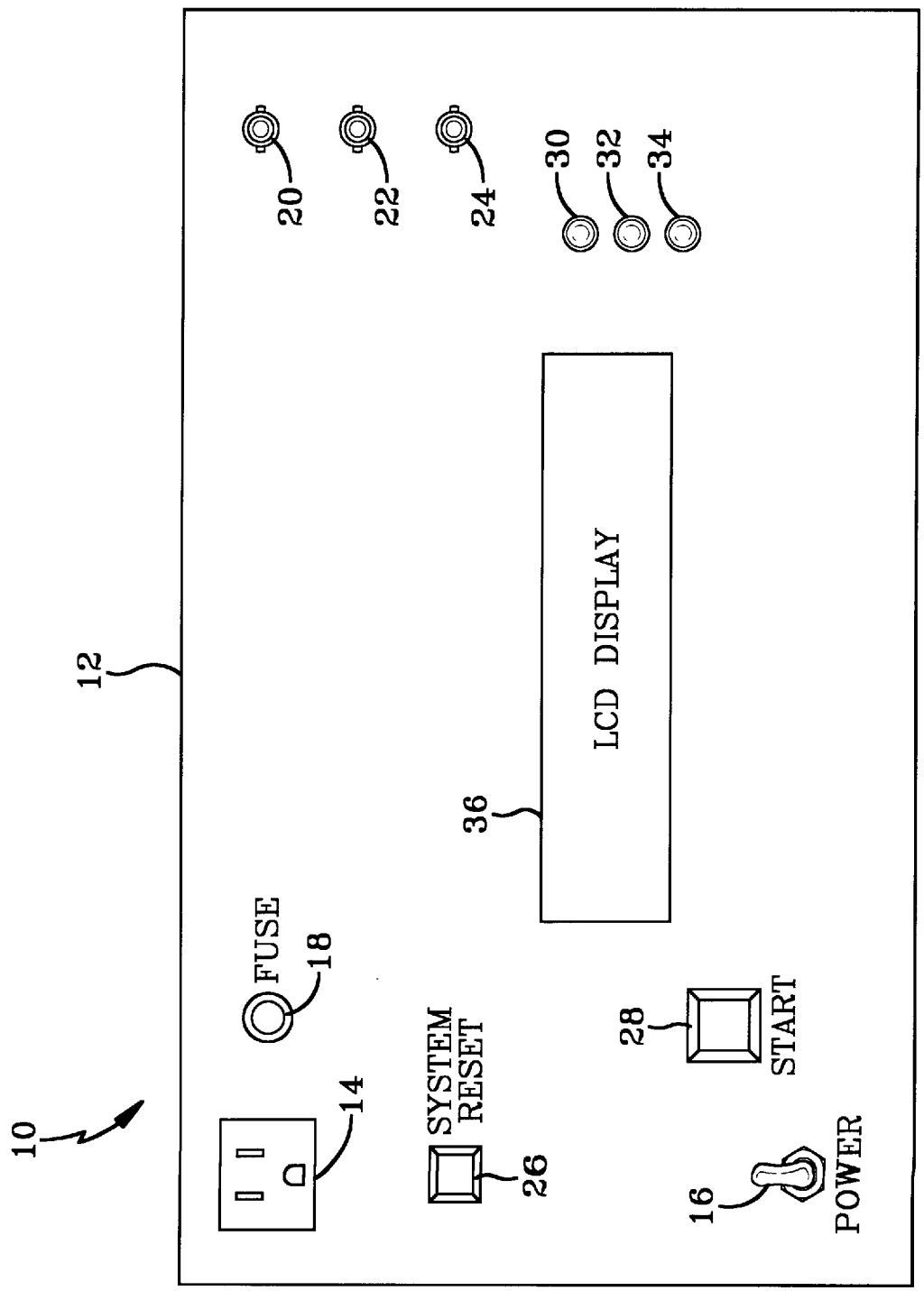
FIG. 1 illustrates an operating panel for the verification system of the present invention.

Referring to the drawings, FIG. 1 illustrates that the system 10 of the present invention includes an operator's panel 12. The system 10 analyzes the performance of the tape recorder having a record input and a playback head providing an output thereof. The tape recorder, in one embodiment, also further comprises means responsive to digital quantities for adjusting the bias and equalization levels of the tape recorder. The tape recorder sometimes undesirably experiences so called "tape dropout conditions" and "dirty heads," with the tape dropout conditions being caused by variation in the signal level of the reproduced tape-recorded data resulting in errors in data reproductions, and with the dirty heads being caused by contaminates that disadvantageously prevent the delivery or pick-up of recorded impulses. The tape dropout conditions are commonly manifested by blanking conditions representative of obscuring or momentary elimination of the desired recorded signal.

The operator's panel 12 of FIG. 1 has a convenience jack 14 that makes available excitation voltage, such as 120 volts A.C., a power on-off switch 16, and a fuse 18 for protecting the equipment of the system 10. The operator's panel 12 further includes monitoring jacks 20, 22, and 24 that respectively make available the RF output of the transmitter of the system 10, the record input to the tape recorder being analyzed by the system 10, and the playback output of the tape recorder. The operator's panel 12 further includes pushbuttons 26 and 28 that respectively provide the control signals of system reset and start.

The operator's panel 12 further includes three LED displays 30, 32, and 34, which when excited respectively denote the functions pass, clean heads, and tape dropout, with the pass indication representative that the tape recorder responded correctly to testing performed by the system 10. The operator's panel 12 still further includes a LCD display 36 on which prompt-type messages to the operator are provided by system 10.

In general, the system 10 provides a predetermined sine wave signal for a predetermined time, such as 15 seconds, that is applied to the record input of the tape recorder being analyzed by the system 10. The system 10 monitors the playback head output of the tape recorder during the recording of the sine wave by the tape recorder. The system 10 provides prompt-type messages to the operator via the LCD display 36 during testing of the tape recorder. The system 10 further includes a digital signal processor (DSP) that preferably employs a fast fourier transform (FFT) to convert, after being converted to digital signals, playback head output quantities into the elementary components thereof. The FFT data is routed to means for receiving and analyzing digital data to determine the performance of the tape recorder.

Figure 2:
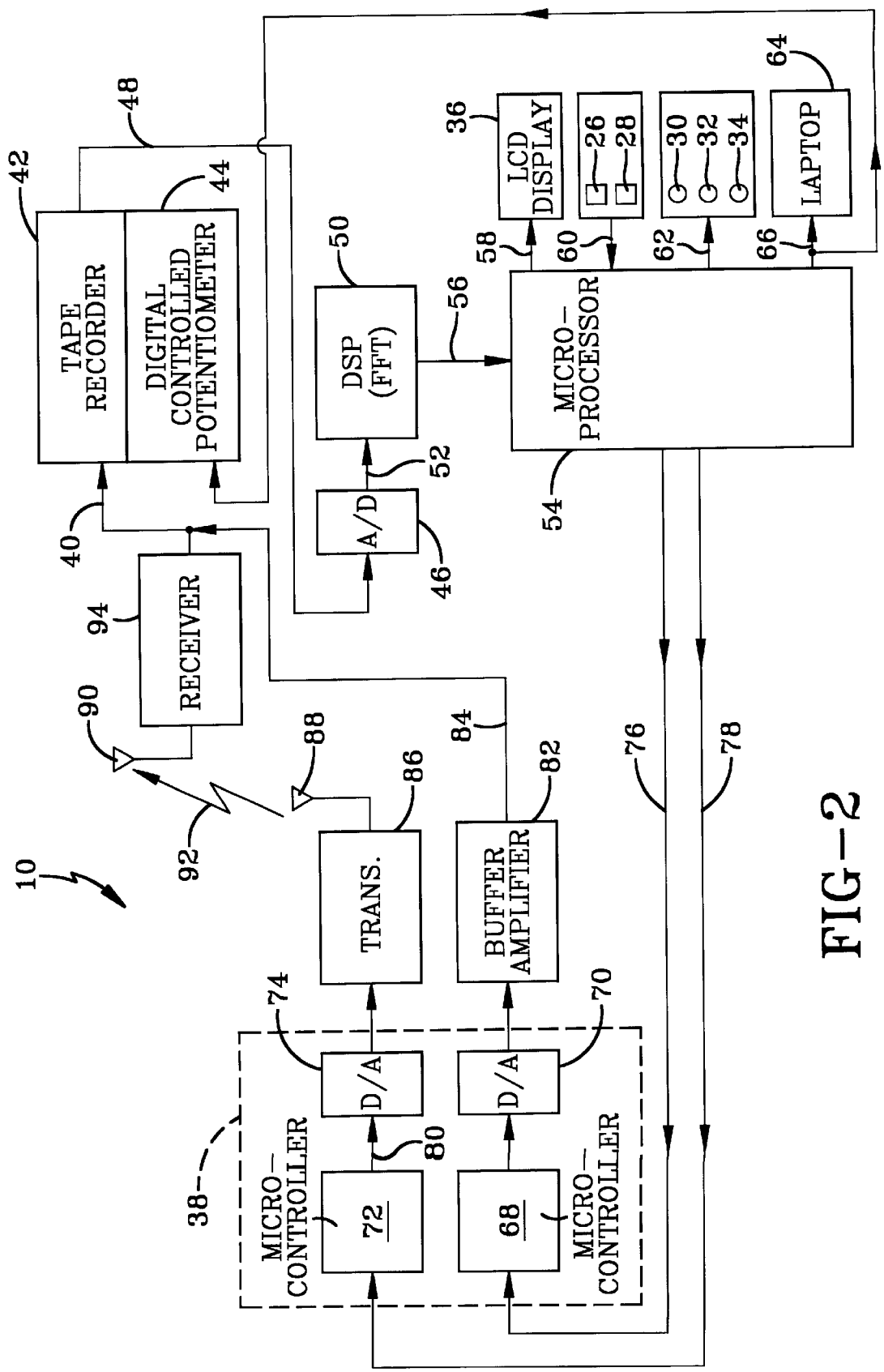
FIG. 2 is a block diagram of the verification system of the present invention.

More particularly, if during the verification by the system 10 blanking on the playback data occurs, the system 10 causes the LCD display 36 to indicate "tape dropout," as well as cause the LED indicator 34 to be illuminated. If the system 10 detects a significant distortion of the signal being recorded by the tape recorder, the system 10 provides the LCD display 36 with a message "clean heads: distortion" as well as illuminates the LED 32 (clean heads). Further, if the system 10 detects that the background noise being recorded by the tape recorder exceeds a predetermined threshold, then the system 10 provides the LCD display 36 with the message "clean heads: noisy tape" and also illuminates the LED 32. If the system 10 does not detect any performance errors with the tape recorder, then the system 10 provides the message "track good" to the LCD display 36, as well as lights the LED 30 (pass) to indicate to the operator that the tape recorder is performing as designed. The display "track good" is indicative that a discrete information band on a tape is good and prompts the operator intervening with the operator's panel 12 to select the next track of the tape recorder being analyzed by the system 10. The operation of the system 10 may be further described with reference to FIG. 2.

In general, the system 10 comprises the signal generator 38 that generates a predetermined waveform, i.e., a sine wave, for a predetermined duration and which waveform is routed to the record input 40 of the tape recorder 42 being analyzed by the system 10. The tape recorder 42 may be used as sonobuoy tape recorder and preferably includes a digital controlled potentiometer 44 that may be made available from Dallas Semiconductor, Inc., and which, in one embodiment as to be further described, is responsive to a first digital quantity for adjusting the bias level of the tape recorder and to a second digital quantity for adjusting the equalization level of the tape recorder.

The system 10 further comprises an analog-to-digital converter 46 which receives the analog information made available at the playback head output of the tape recorder 42 on signal path 48. The analog-to-digital converter 46 provides a digital output routed to digital signal processor (DSP) 50 by way of signal path 52. The digital signal processor (DSP) 50 receives the digital output of the A/D converter 46 and converts, preferably by means of a fast fourier transform (FFT), the digital output into a digital data representative comprised of elementary components and provides a steady stream of FFT data to the means 54 for analyzing the digital data by way of signal path 56. The means 54 for receiving and analyzing the digital data may comprise a microprocessor that services the LCD display 36 via output port 58, and responds to the pushbutton 26 (system reset), and pushbutton 28 (start), via input port 60. The microprocessor 54 also services the indicators 30, 32 and 34 by way of output port 62 and also may service a laptop computer 64 by way of serial port 66, preferably employing an RS232 interface, which is also routed to and services the digital controlled potentiometer 44 of the sonobuoy tape recorder 42.

The signal generator 38 preferably comprises a first arrangement of a microcontroller 68 and a D/A converter 70 and a second arrangement of a microcontroller 72 and a D/A converter 74. Further, the microcontrollers 68 and 72 are responsive to the microprocessor 54 via control and data lines 76 and 78 respectively. During reset each of the microcontrollers 68 and 72 has a default frequency, typically 1000 Hz. During the reset condition, if the microprocessor 54 provides the low condition on the respective control and data line 76 or 78, then the associated microcontroller 68 or 72 reads frequency and amplitude quantities defined by the microprocessor 54 via a stream of digital data present on control and data line 76 or 78 respectively. The microcontrollers 68 and 72 each have a ROM and may each consist of a Microchip 16C56 microprocessor, whereas the D/A converters 70 and 74 may each be of an 8 bit type ML2341, all of which are known in the art.

In general, each of the microcontrollers 68 and 72 has an accessible and retrievable look-up table defining predetermined waveforms in a digital format which are respectively routed to the D/A converter 70 and 74 for providing the corresponding analog outputs therefrom. Further, the microcontroller 72 preferably provides predistorted predetermined waveforms that reduce modulation distortion, to be described hereinafter with reference to expressions (1) and (2), by way of signal path 80. If desired, although not preferred, the microcontrollers 68 and 72 may be provided by a single microcontroller preferably so long as the single microcontroller provides for a predetermined and predistorted signal on path 80.

The microcontrollers 68 and 72 provide the means for generating the predetermined waveforms digitally with amplitude steps being controllable in 0.04 dB fine tune steps which are advantageously handled by the 8 bit D/A converters 70 and 74. The predetermined waveforms may be selected by the microprocessor 54 placing appropriate data on respective control and data lines 76 and 78. The D/A converters 70 and 74 preferably have two gain control inputs which may be utilized to allow a pseudo effect of increasing the dynamic range of the amplitude of the waveform stored in the microcontrollers 68 and 72 and generated by the signal generator 38.

In one embodiment of the present invention, the analog output of the D/A converter 70 is supplied to a buffer amplifier 82 which may be an operational amplifier having a low impedance output driver. The output of buffer amplifier 82 is applied to the record input 40 of the sonobuoy tape recorder 42 via signal path 84.

In another embodiment, the D/A converter 74 provides an analog output signal that is applied to a transmitter 86 which, in turn, delivers its output to an antenna 88 which, in turn, transmits (in analog form) the predetermined waveform stored in the microcontroller 72 to an antenna 90 by way of transmission path 92. The antenna 90 routes its received signal to a receiver 94, which in one embodiment, may be a sonobuoy receiver that delivers its output to the record input 40 of the sonobuoy tape recorder 42.

The utilization of the transmitter 86 allows for the verification of the performance of the sonobuoy receiver 94 interaction with the sonobuoy tape recorder 42, as well as verifying the continuity of the cables interconnecting the sonobuoy receiver 94 to the sonobuoy tape recorder 42. Further, the transmitter 86 eliminates the need of the operator connecting the signal line 84 to the record input 40 for test purposes of the tape recorder 42 and subsequently the problem of forgetting to reconnect the interface between the sonobuoy receiver 94 and the sonobuoy recorder 42 for tactical purposes.

The transmitter 86 may comprise a variactor diode and crystal combined, in a manner known in the art, to form a Colpitts oscillator operated on the third overtone of the crystal. The output of the Colpitts oscillator is fed into a frequency doubler to double the frequency thereof and to serve as a carrier frequency so as to accommodate the VHF sonobuoy range. The use of a variactor diode for the transmitter 86 causes a non-linear output response created by the behavior of a variactor diode which may be further described with reference to FIG. 3.

Figure 3:
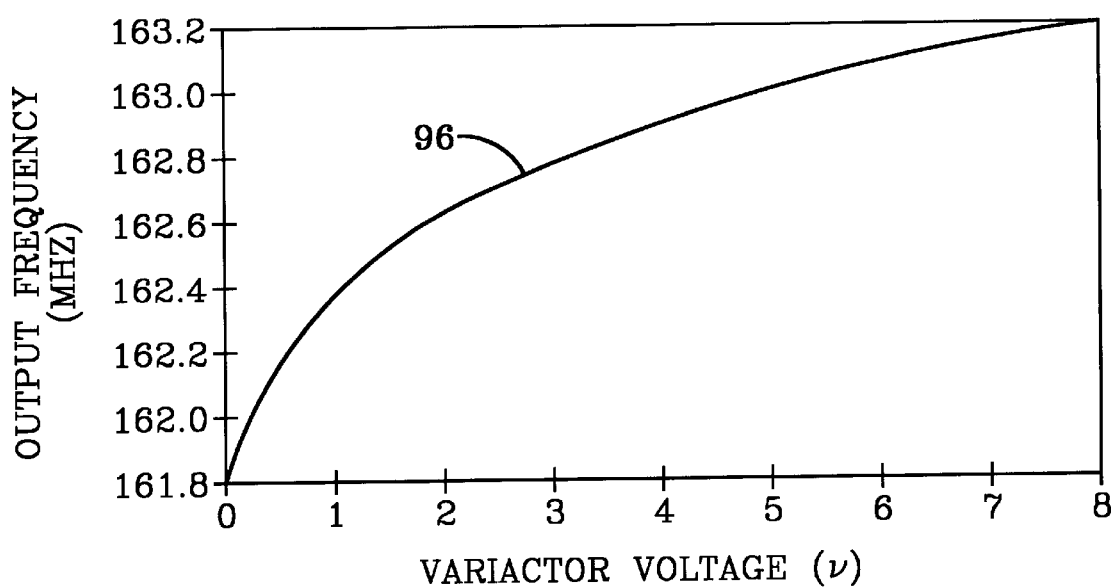
FIG. 3 illustrates the operational response of a typical variactor used in the transmitter of the present invention.

FIG. 3 illustrates a non-linear plot 96 which leads to unacceptable distortion levels of the modulated waveform at the frequency range related to the present invention which includes the frequencies that are specified in the Y axis of FIG. 3. FIG. 3 has an X-axis given in terms of the voltage (variactor voltage (v)) potential applied across the variactor diode of the transmitter 86. The characteristics of the non-linear plot 96 can be modeled using the below expression 1:

$$f = 162.37 + 0.3293 \cdot \ln(v) + 0.0696 \cdot \ln(v)^2 - 0.041 \cdot \ln(v)^3 - 0.0362 \cdot \ln(v)^4 + 0.0795 \cdot \ln(v)^5 - 0.0417 \cdot \ln(v)^6 + 0.0069 \cdot \ln(v)^7 \quad (1)$$

where v is the voltage potential across the variactor diode given in volts, and $f$ is the output carrier frequency in MHz of the transmitter 86.

By utilizing the characteristics defined by expression (1), the correct amount of second harmonic predistortion, previously mentioned with reference to microcontroller 72, can be determined. For example, let $v_0$ the dc bias voltage potential across the variactor diode within the transmitter 86, $v_1$ represent the voltage potential across the variactor diode at the positive peak of an undistorted sine wave source, and $v_2$ represent the voltage potential across the variactor diode at the negative peak of an undistorted sine wave source. Let $f_0, f_1$, and $f_2$ represent the carrier frequency as applied by the above expression (1), for $v_0$, $v_1$ and $v_2$ respectively. The amount of second harmonic distortion (A) to predistort the sinewave is given by the below expression (2):

$$A = \frac{f_o - \left(\frac{f_1 + f_2}{2}\right)}{f_1 - f_2} \quad (2)$$

Adding this second harmonic distortion to the sine wave stored in the ROM of microcontroller 72 and predistorting the waveform thereof cancels the distortion of the modulation within the transmitter 86. This cancellation allows the transmitter 86 employing a variactor diode to yield acceptable performance for the system 10 of the present invention. The operation of the system without and with the predistortion defined by expression (2) may be further described with reference to FIG. 4.

Figure 4A:
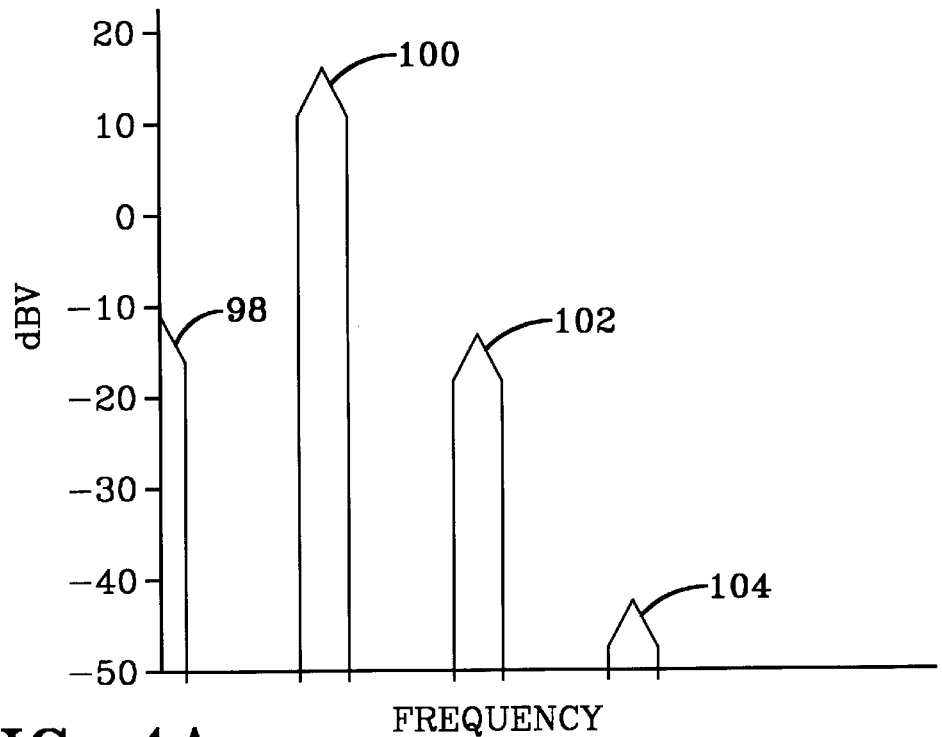
FIG. 4 is composed of FIGS. 4(A) and 4(B) which respectively illustrate the modulated signals within the transmitter without antidistortion compensation and with the antidistortion benefits of the present invention.
Figure 4B:
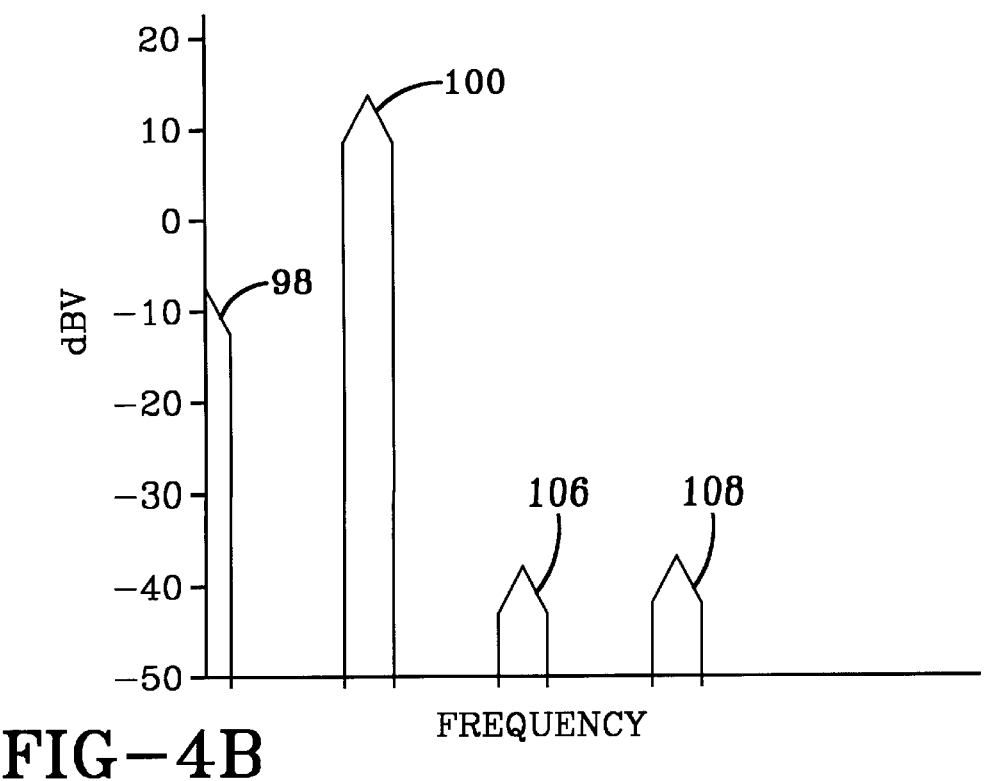

FIG. 4 is composed of FIGS. 4(A) and 4(B). FIG. 4(A) shows a plurality of spike waveforms 98, 100, 102 and 104, separated from each other by the modulation frequency. Similarly, FIG. 4(B) shows a plurality of spike waveforms 98, 100, 106 and 108 separated from each other by the modulation frequency. It should be noted that both FIGS. 4(A) and 4(B) possess spike waveforms 98 and 100, with spike waveform 100 being representative of first harmonic (fundamental) of the modulation frequency. Similarly, the spike signals 102 and 106 of FIGS. 4(A) and 4(B) represent the respective second harmonic of the modulation frequency. FIG. 4(A) illustrates the spike waveforms generated by the transmitter 86 not having the benefits provided by the antidistortion factors defined by expressions 1 and 2, whereas FIG. 4(B) illustrates the spike waveforms generated by the transmitter 86 having the benefits of the antidistortion function defined by expressions 1 and 2.

A review of FIG. 4(A) reveals that the peak amplitudes of spikes 100 and 102 are separated from each other by an amount of approximately 27 dBV, whereas FIG. 4(B) illustrates that the peak amplitudes of spikes 100 and 106 are separated from each other by a quantity of 52 dBV. Accordingly, the operation of the transmitter 86 that provides for the pulses 100 and 106 provide an increased attenuation of 25 dBV (52−27) between the first and second harmonics thereof so as to provide a much better reference signal to be routed to the record input 40 of the sonobuoy tape recorder 42. The response of the tape recorder 42 to the signals at its record input 40 are made available on signal path 48 which is routed to the analog-to-digital converter 46 shown in FIG. 2.

The A/D converter 46 routes its digital quantities to the DSP 50. The A/D converter 46 may be of the type AD1847 made available from Analog Device, whereas the DSP 50 may be of the type ADSP-2181 of Analog Device. The DSP 50 is programmed so as to constantly collect the digital waveform, present on signal path 52, in real time and send the resulting FFT data, created by the operation of DSP 50, in a continuous stream to the microprocessor 54, via signal path 56.

The microprocessor 54 has a RAM, may be a single chip 8051 made available from Intel, and performs the analysis of the FFT data stream generated by the DSP 50. In general, and as will be also described hereinafter with reference to FIGS. 5 and 6, the microprocessor 54 determines the fundamental frequency of the FFT digital data, determines the average amplitude of the digital data, and determines the harmonic frequencies of the digital data.

More particularly, the microprocessor 54 records the amplitude value of the fundamental frequency of the predetermined waveform. In actuality, the frequency of the predetermined waveform stored in the ROM of either the microcontroller 68 or 72 is selected by the application routines running in the microprocessor 54, and access and retrieved by the selected microcontroller 68 or 72. The microcontroller 54 averages the amplitude of all of the data, except for the waveform frequency generated by signal generator 38 and harmonics thereof, and records the average which represents the noise level associated with the tape recorder 42. The harmonics of the data are separated and recorded as total harmonic distortion (THD). The microprocessor 54 gathers the three data quantities (fundamental frequency, noise and harmonics) continuously in a table in the RAM of microprocessor 54 for a predetermined period, such as 15 seconds. At the end of this 15 second duration, if any noise average quantity is above a predetermined threshold value, the microprocessor 54, via signal path 58, generates an appropriate digital signal data so as that the LCD display 36 reads (clean heads: noisy tape). Typical noise average, and frequency and harmonics (THD) quantities, are shown in FIGS. 5 and 6 to be described hereinafter.

If any of the harmonic (THD) values are out of specification, the microprocessor 54 provides appropriate digital signals so that the LCD display 36 indicates "clean heads: distortion." The amplitude of fundamental frequency plot versus time of the recorded data is processed to look at the total number of dropouts and the length of dropouts. If any of these recorded data is unacceptable, the microprocessor 54 provides appropriate digital signals to the LCD display 36 so as to display the message "tape dropout." If all of the tests pass, the microprocessor 54 provides appropriate digital signals to the LCD display 36 to indicate the message "track good" for a period, such as two seconds, and prompts the operator to adjust the tape recorder 42 to exercise the next track in sequence and accomplishes such with digital signals to display a message, for example, "set thumbwheel to track: 12." When all of the tracks of the tape recorder 42 have been exercised and verified, the microprocessor 54 provides appropriate digital signals to the LCD display 36 to indicate "tape recorder passed" and the testing is then completed. The data gathered and analyzed by the application routines running in the microprocessor 54 may be displayed on the laptop computer 64, via a signal path 66, and may be further described with reference to FIGS. 5 and 6.

Figure 5A:
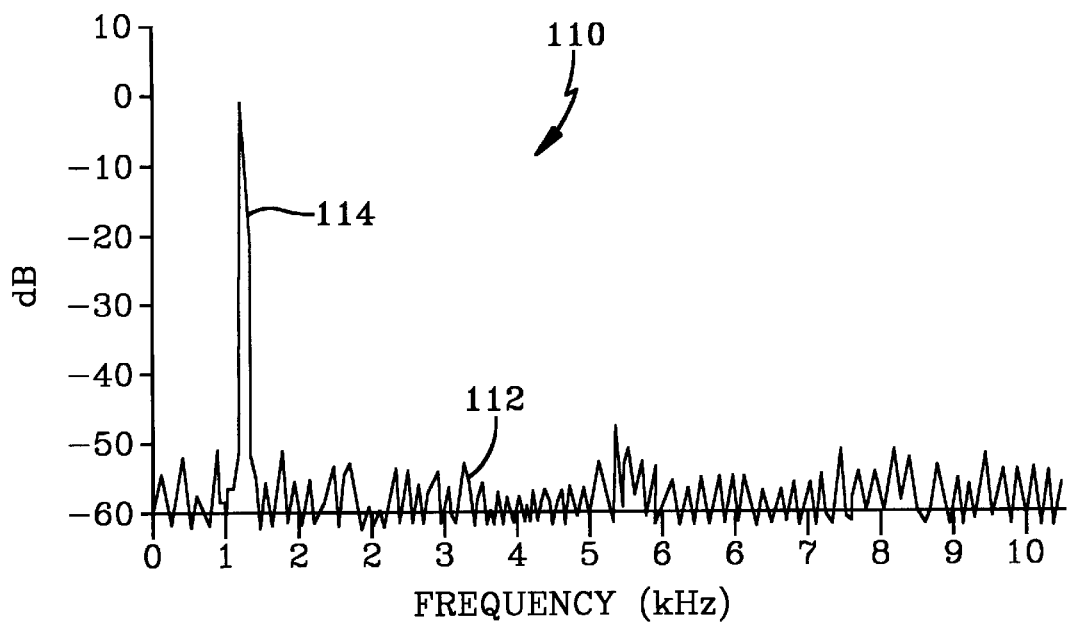
FIG. 5 is composed of FIGS. 5(A) and 5(B) that respectively illustrate the fast fourier transform (FFT) digital data associated with a good record data head and with a dirty tape head.
Figure 5B:
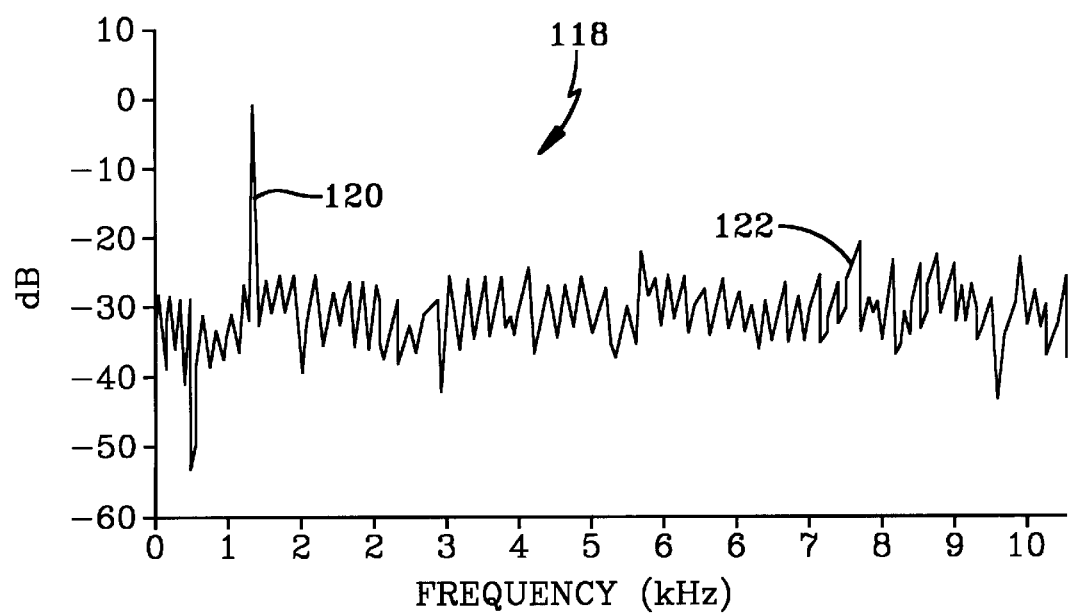

FIG. 5 has a Y-axis given in dB, an X-axis given in frequency (KHz) and is composed of FIGS. 5(A) and 5(B) which respectively indicate FFT data associated with good record data and the FFT data associated with dirty tape heads. As seen in FIG. 5(A) the good data is shown by a plot 110 having a baseline 112 located near the −60 dB value of the Y-axis and a peak portion 114 having an upper value of near the 0 value of the Y-axis. Conversely, FIG. 5(B) shows the FFT data associated with the dirty tape head as a plot 118 having a baseline 122 located near the −30 dB value of the Y-axis and a peak portion 120 having an upper value of approximately 0 dB. The baseline 122 of FIG. 5(B) has a value (−30 dB) which represents a noise value which exceeds the predetermined threshold value and which would be treated by the practice of the present invention as a failure condition of the tape recorder 42 being analyzed.

Figure 6A:
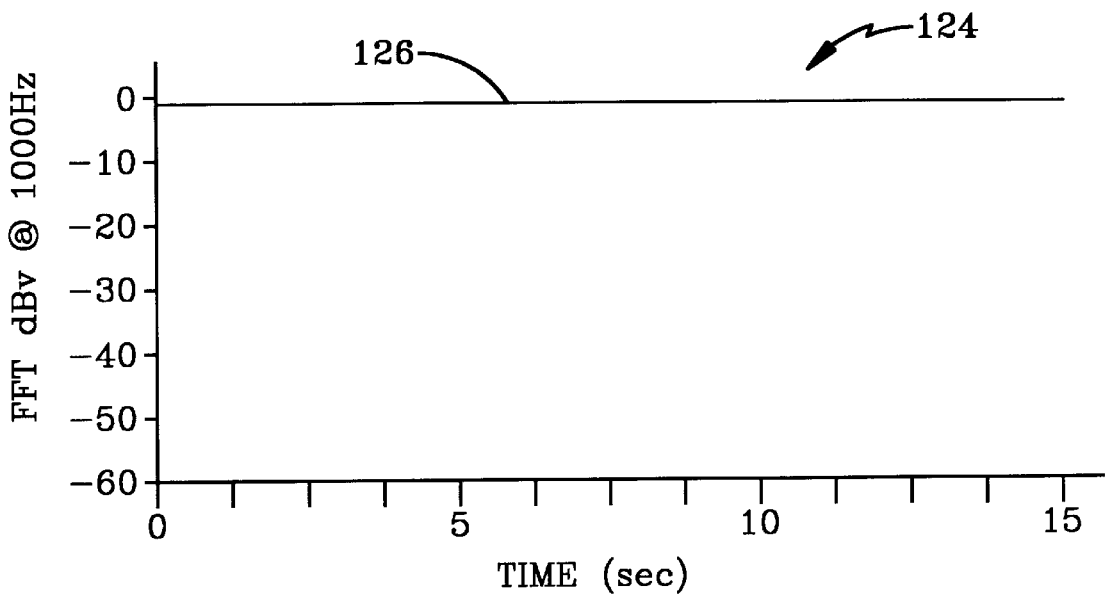
FIG. 6 is composed of FIGS. 6(A) and 6(B) that respectively illustrate waveforms associated with clean heads and a good tape and with bad heads recording excessive dropout conditions.
Figure 6B:
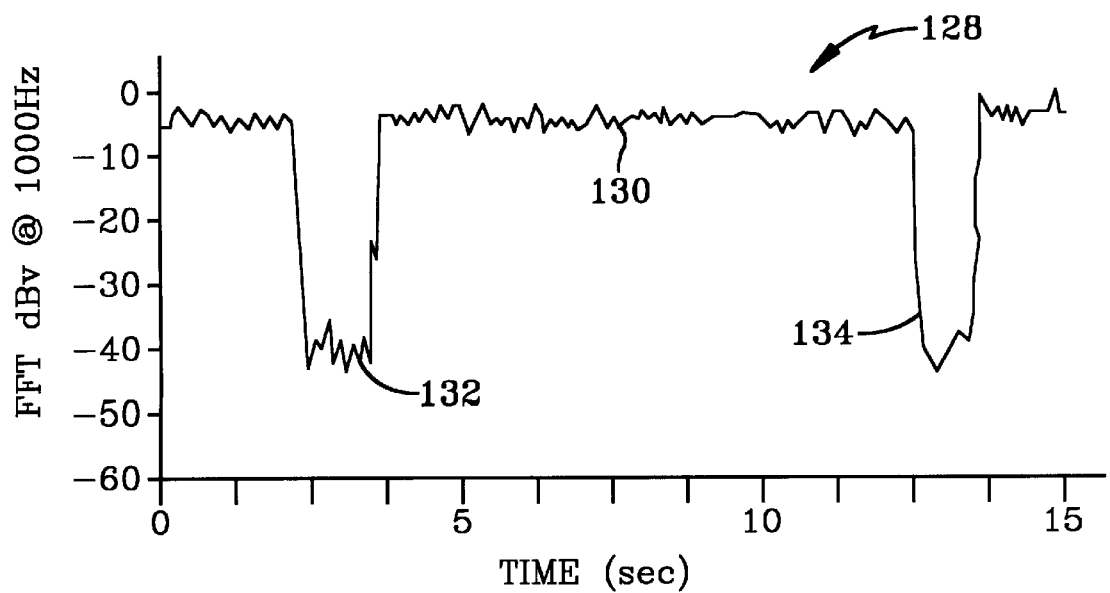

FIG. 6 is composed of FIGS. 6(A) and 6(B) that respectively indicate the response of clean heads and good tapes and bad tape recording having excessive dropout. FIG. 6 has a Y-axis representative of the FFT data, at a given dBV and at a fundamental frequency of 1000 Hz, collected by the microprocessor 54. FIG. 6 also has an X-axis given in seconds and representative of data gathering for a predetermined duration of 15 seconds. FIG. 6(A) shows a plot 124 having a steady baseline 126 having a value approximately 0 dB. Conversely, FIG. 6(B) shows a plot 128 with a baseline 130 of approximately 0 dB level, but with signals 132 and 134 indicative of data dropouts which characterize the tape being analyzed by the system 10 as having a bad or non-acceptable dropout recording rate.

It should now be appreciated that the practice of the present invention provides a system 10 which allows for the easy operation and determination for verifying the performance of a tape recorder. Further, the system 10 prompts the operator, by way of the LCD display, so that an unskilled person can perform the tape recorder performance testing without any undue burden.

Although the hereinbefore given description for the practice of the present invention was primarily related to the verification of the proper tape recorder operation concerning data dropout and clean heads, the practice of this invention further contemplates the ability to provide for an automatic adjustment of the bias and equalization levels of the tape recorder 42 which, in one embodiment, has the digital controlled potentiometer 44. The digital controlled potentiometer 44 is responsive to a first digital quantity, via signal path 66, generated by the microprocessor 54 for adjusting the bias level of the tape recorder, and also to a second digital quantity, via signal path 66, generated by the microprocessor 54 for adjusting the equalization level of the tape recorder.

In the practice of the present invention for adjusting the bias and equalization levels, the microcontroller, such as microcontroller 68, is selected, via signal path 76, to access and retrieve a predefined waveform in its RAM that may be used to generate distortion levels and waveform amplitudes that may be analyzed so as to fine tune the bias and equalization levels of the tape recorder in a manner to match the specific tape being recorded. The adjustments are made on a closed-loop basis with the microprocessor 54 selecting the desired values, looking at the actual values and making the selection and adjustments so that the desired and actual values are made substantially equal to each other. The microprocessor 54 contains these selected values and if the digital signals flowing into microprocessor 54, via the more accurately defined FFT data stream on signal path 56 does not match the desired values, then the microprocessor 54, in one embodiment, via the LCD display 36 displays messages on which direction to turn respective trimmers that manually control bias and equalization levels so that the desired and actual values match, thereby, properly adjusting the bias and equalization levels of the tape recorder.

In another embodiment, having the benefits of the digital controlled potentiometer 44 of FIG. 1 not needing operator intervention, the adjustment of the actual values to match the desired values may be accomplished by allowing the microprocessor 54 to provide for the necessary quantities (first and second digital quantities) via signal path 66 to the digital control potentiometer 44. The microprocessor 54 serves as the controlling device in a closed-loop system.

It should now be appreciated that the practice of the present invention provides for a method for manually and automatically adjusting the bias and equalization levels of a tape recorder.

It is understood that the invention is not limited to the specific embodiments herein illustrated in this description but may be otherwise without departing from the spirit and scope of this invention.

What I claim is:

1. A system for analyzing the performance of a tape recorder having a record input and a playback head providing an output thereof, said system comprising:

(a) a signal generator that repeatedly generates a predetermined waveform for a predetermined duration which is routed to the record input of the tape recorder;

(b) an analog-to-digital converter receiving the output of the playback head and providing a corresponding digital signal thereof;

(c) a digital signal processor that receives the digital signal and converts it into digital data representative of elementary components thereof; and (d) means for receiving and analyzing the digital data to determine the performance of the tape recorder, said means for analyzing digital data comprising:

(i) means for determining the fundamental frequency of data said repeatedly generated said predetermined waveform;

(ii) means for determining the average of said repeatedly generated said predetermined waveform; and (iii) means for determining the harmonic frequencies of said repeatedly generated said predetermined waveform.

2. A method for analyzing the performance of a tape recorder having a record input and a playback head providing an output thereof, said method comprising the steps of:

(a) repeatedly generating a predetermined waveform for a predetermined duration and which waveform is routed to the record input of the tape recorder;

(b) receiving the output of the playback head and providing a corresponding digital signal thereof;

(c) receiving the digital signal and converting the digital signal by a fast fourier transform (FFT) into digital data representative of elementary components thereof; and (d) receiving and analyzing the digital data to determine the performance of the tape recorder, said step of receiving and analyzing digital data comprising:

(i) determining the average of the digital data so as to determine the noise level of the digital data;

(ii) comparing the determined noise level of the digital data to determine if a predetermined threshold value is exceeded and, if so, generating an alarm indicative of a malfunction of said tape recorder;

(iii) determining the harmonic frequencies of said repeatedly generated said predetermined waveform; and (iv) comparing the determined harmonic frequencies to determine if a threshold value is exceeded and, if so, generating an alarm indicative of a malfunction of said tape recorder.

3. A method for analyzing the performance of a tape recorder having a record input, a playback head providing an output thereof and means responsive to a first digital quantity for adjusting a bias level of said tape recorder and a second digital quantity for adjusting an equalization level of said tape recorder, said method comprising the steps of:

(a) repeatedly generating a predetermined waveform having a predetermined amplitude for a predetermined duration;

(b) routing said predetermined waveform to the record input of the tape recorder;

(c) receiving the outputs of the playback head of said recorder and providing corresponding digital signals thereof;

(d) receiving the digital signals and converting the digital signals by a fast fourier transform (FFT) into digital data representative of elementary components thereof;

(e) determining the amplitude of the converted digital data;

(f) comparing said amplitude against said predetermined amplitude and if a difference exists therebetween which exceeds a predetermined value, then generating said first digital quantity for adjusting said bias level of said tape recorder;

(g) determining a distortion level of the digital data; and (h) comparing said distortion level against a predetermined distortion level and if a difference exists therebetween exceeds a predetermined value, then generating said second digital quantity for adjusting said distortion level of said tape recorder.

4. A system for analyzing the performance of a tape recorder having a record input and a playback head providing an output thereof, said tape recorder further comprising an input signal receiver that precedes and supplies a received signal to said record input, said system comprising:

(a) a signal generator that generates a predetermined waveform for a predetermined duration which is routed to the record input of the tape recorder, said signal generator comprising:

(i) a microcontroller having an accessible and retrievable look-up table defining said predetermined waveform in a digital format; and (ii) a digital-to-analog converter receiving said retrievable predetermined waveform and providing a corresponding analog signal thereof;

(b) a transmitter receiving said predetermined waveform of said signal generator and transmitting said predetermined waveform to said input signal receiver of said tape recorder;

(c) an analog-to-digital converter receiving the output of the playback head and providing a corresponding digital signal thereof;

(d) a digital signal processor that receives the digital signal and converts it into digital data representative of elementary components thereof; and (e) means for receiving and analyzing the digital data to determine the performance of the tape recorder.

5. The system according to claim 4, wherein said accessible and retrievable predetermined waveform is defined so as to reduce modulation distortion encountered by being received and transmitted by said transmitter.

* * * * *